US006477452B2

(12) United States Patent
Good

(10) Patent No.: US 6,477,452 B2
(45) Date of Patent: *Nov. 5, 2002

(54) VEHICLE SERVICE STATUS TRACKING SYSTEM AND METHOD

(75) Inventor: Gary D. Good, Burleson, TX (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/939,164

(22) Filed: Aug. 24, 2001

(65) Prior Publication Data

US 2002/0032505 A1 Mar. 14, 2002

Related U.S. Application Data

(63) Continuation of application No. 09/607,189, filed on Jun. 29, 2000.

(51) Int. Cl.[7] .......................... G01M 17/00; G06F 7/00; G06F 19/00

(52) U.S. Cl. ................................ 701/29; 701/200-215; 701/30-33; 340/52 D; 340/52 F; 340/531; 340/539; 340/439; 340/901; 340/990; 340/993; 455/66; 455/99; 455/466; 455/553; 455/556

(58) Field of Search .......................... 701/29, 200–215, 701/30–33, 36; 340/52 D, 52 F, 531, 539, 439, 901, 990, 993, 998, 907, 995; 455/66, 99, 466, 553, 556

(56) References Cited

U.S. PATENT DOCUMENTS

| | | | | |
|---|---|---|---|---|
| 12,976 A | * | 5/1855 | Menig et al. | 278/25 |
| 4,258,421 A | | 3/1981 | Juhasz et al. | 363/424 |
| 4,506,337 A | | 3/1985 | Yasuhara | 701/29 |
| 4,533,900 A | | 8/1985 | Muhlberger | 340/52 R |
| 4,601,127 A | | 7/1986 | Neely et al. | 179/2 A |
| 4,739,482 A | | 4/1988 | Wrigge | 701/29 |
| 4,991,169 A | | 2/1991 | Davis et al. | 370/77 |
| 5,751,338 A | | 5/1998 | Ludwig, Jr. | 348/17 |
| 5,819,201 A | | 10/1998 | DeGraaf | 701/208 |
| 5,933,080 A | | 8/1999 | Nojima | 340/539 |
| 6,023,232 A | | 2/2000 | Eitzenberger | 340/988 |
| 6,038,508 A | | 3/2000 | Maekawa et al. | 701/207 |
| 6,067,009 A | | 5/2000 | Hozuka et al. | 340/459 |
| 6,067,486 A | | 5/2000 | Aragones et al. | 701/29 |
| 6,097,313 A | | 8/2000 | Takahashi et al. | 340/905 |
| 6,119,060 A | | 9/2000 | Takayama et al. | 701/36 |

(List continued on next page.)

*Primary Examiner*—William A. Cuchlinski, Jr.
*Assistant Examiner*—Ronnie Mancho
(74) *Attorney, Agent, or Firm*—Jeffer, Mangels, Butler & Marmaro LLP

(57) ABSTRACT

A system and methods to allow multiple stations in geographically dispersed locations to monitor and track vehicle repair record and service status information in a coordinated fashion. In a service area comprised of a number of geographically-bounded service regions, at least one regional communications terminal is provided in communication with a plurality of local communications terminals. Each local communications terminal and regional communications terminal communicates with a vehicle service status database. Vehicle service events are entered into a vehicle tracking system and maintained using the vehicle status database. Database files are exchanged between local communications terminals and regional communications terminals and with a central equipment manager in order to provide timely and accurate dissemination of service status. Vehicle service status, including an equipment availability prediction, is shared with marketing offices and retail locations to enable personnel at such locations to make informed decisions in allocating particular equipment to a customer based on the customer's needs.

15 Claims, 16 Drawing Sheets

U.S. PATENT DOCUMENTS

| | | | | | |
|---|---|---|---|---|---|
| 6,154,658 | A | | 11/2000 | Caci | 455/466 |
| 6,169,943 | B1 | | 1/2001 | Simon et al. | 701/29 |
| 6,172,602 | B1 | | 1/2001 | Hasfjord | 340/438 |
| 6,195,602 | B1 | | 2/2001 | Hazama et al. | 701/48 |
| 6,308,120 | B1 | * | 10/2001 | Good | 340/438 |
| 6,314,375 | B1 | * | 11/2001 | Sasaki et al. | 702/185 |
| 6,314,422 | B1 | * | 11/2001 | Barker et al. | 340/539 |
| 6,317,666 | B1 | * | 11/2001 | List et al. | 123/205 |
| 6,321,142 | B1 | * | 11/2001 | Shutty | 701/1 |
| 6,321,150 | B1 | * | 11/2001 | Nitta | 701/29 |

* cited by examiner

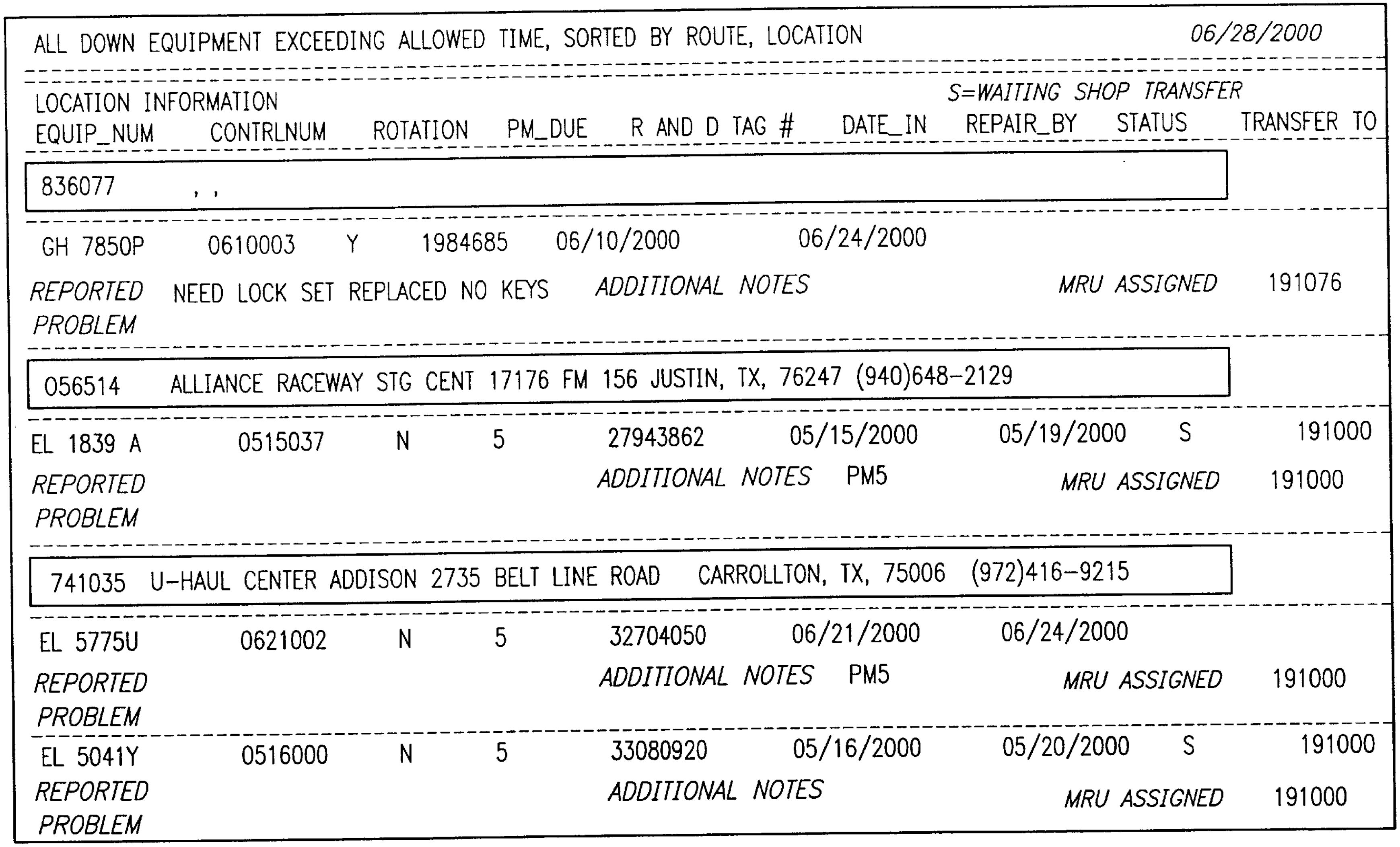

ALL DOWN EQUIPMENT EXCEEDING ALLOWED TIME, SORTED BY ROUTE, LOCATION 06/28/2000

LOCATION INFORMATION S=WAITING SHOP TRANSFER

| EQUIP_NUM | CONTRLNUM | ROTATION | PM_DUE | R AND D TAG # | DATE_IN | REPAIR_BY | STATUS | TRANSFER TO |
|---|---|---|---|---|---|---|---|---|
| 836077 , , | | | | | | | | |
| GH 7850P | 0610003 | Y | 1984685 | 06/10/2000 | 06/24/2000 | | | |
| REPORTED PROBLEM | NEED LOCK SET REPLACED NO KEYS | | | ADDITIONAL NOTES | | MRU ASSIGNED | | 191076 |
| 056514 ALLIANCE RACEWAY STG CENT 17176 FM 156 JUSTIN, TX, 76247 (940)648-2129 | | | | | | | | |
| EL 1839 A | 0515037 | N | 5 | 27943862 | 05/15/2000 | 05/19/2000 | S | 191000 |
| REPORTED PROBLEM | | | | ADDITIONAL NOTES | PM5 | MRU ASSIGNED | | 191000 |
| 741035 U-HAUL CENTER ADDISON 2735 BELT LINE ROAD CARROLLTON, TX, 75006 (972)416-9215 | | | | | | | | |
| EL 5775U | 0621002 | N | 5 | 32704050 | 06/21/2000 | 06/24/2000 | | |
| REPORTED PROBLEM | | | | ADDITIONAL NOTES | PM5 | MRU ASSIGNED | | 191000 |
| EL 5041Y | 0516000 | N | 5 | 33080920 | 05/16/2000 | 05/20/2000 | S | 191000 |
| REPORTED PROBLEM | | | | ADDITIONAL NOTES | | MRU ASSIGNED | | 191000 |

FIG. 18

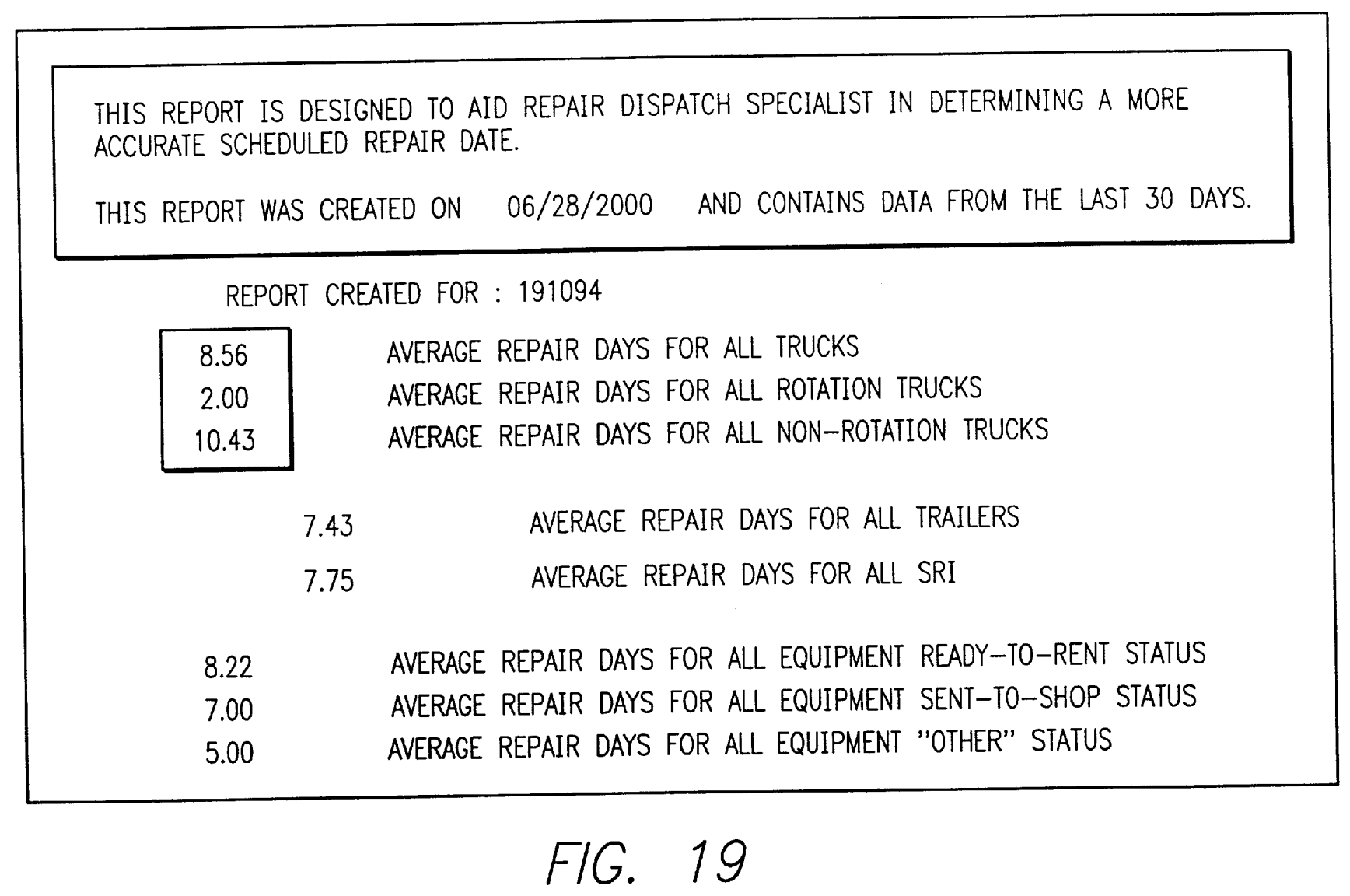

THIS REPORT IS DESIGNED TO AID REPAIR DISPATCH SPECIALIST IN DETERMINING A MORE ACCURATE SCHEDULED REPAIR DATE.

THIS REPORT WAS CREATED ON 06/28/2000 AND CONTAINS DATA FROM THE LAST 30 DAYS.

REPORT CREATED FOR : 191094

| | |
|---|---|
| 8.56 | AVERAGE REPAIR DAYS FOR ALL TRUCKS |
| 2.00 | AVERAGE REPAIR DAYS FOR ALL ROTATION TRUCKS |
| 10.43 | AVERAGE REPAIR DAYS FOR ALL NON-ROTATION TRUCKS |
| 7.43 | AVERAGE REPAIR DAYS FOR ALL TRAILERS |
| 7.75 | AVERAGE REPAIR DAYS FOR ALL SRI |
| 8.22 | AVERAGE REPAIR DAYS FOR ALL EQUIPMENT READY-TO-RENT STATUS |
| 7.00 | AVERAGE REPAIR DAYS FOR ALL EQUIPMENT SENT-TO-SHOP STATUS |
| 5.00 | AVERAGE REPAIR DAYS FOR ALL EQUIPMENT "OTHER" STATUS |

FIG. 19

DOWNED EQUIPMENT REPORT

| EQUIP. NUM. | CONTROL NUM. | ROTATION | PM DUE | DATE IN | REPAIR BY | STATUS |
|---|---|---|---|---|---|---|
| LOCATION: 42381 | AGGIE FEED STORE INC | | 9105 HAWN FRWY | | DALLAS | TX |
| 0000 TD 3433 | 623022 | F | | 06/23/00 | 09/23/00 | NEW |
| *REPORTED PROBLEM* | BOTH FENDERS DAMAGED | | | | | |
| LOCATION: 42419 | J H CORP | | 5118 GREENVILLE AVENUE | | DALLAS | TX |
| 0000 EL 7528T | 0 | F | | 05/31/00 | 06/02/00 | CLOSED |
| *REPORTED PROBLEM* | | | | | | |
| LOCATION: 42714 | REIGEL'S SERVICE | | 3400 COMERCE | | DALLAS | TX |
| 0000 DC 7831A | 626069 | F | | 06/26/00 | 07/10/00 | NEW |
| *REPORTED PROBLEM* | CHECK STEERING | | | | | |
| LOCATION: 44795 | NORTHWEST HWY SELF | | 1975 WEST NORTHWEST HWY | | DALLAS | TX |
| 0000 DC 0366C | 0 | F | | 06/01/00 | 06/08/00 | CLOSED |
| *REPORTED PROBLEM* | CHECK FOR VENT HOSE TO FUEL TANK | | | | | |
| 0000 EL 7018X | 626063 | F | | 06/26/00 | 07/10/00 | NEW |
| *REPORTED PROBLEM* | A/C BLOWER INOP. | | | | | |
| 0000 JH 5333P | 0 | F | | 06/16/00 | 06/20/00 | CLOSED |
| *REPORTED PROBLEM* | | | | | | |

*FIG. 20*

VEHICLE SERVICE STATUS TRACKING SYSTEM AND METHOD

This is a continuation of Ser. No. 09/607,189 filed Jun. 29, 2000.

A portion of this disclosure contains material which is subject to copyright protection. The copyright owner has no objection to the facsimile reproduction by anyone of the patent document or patent disclosure, as it appears in the Patent and Trademark Office files or records, but otherwise reserves all copyright rights whatsoever.

FIELD OF THE INVENTION

The present invention relates to a vehicle service status tracking system and method.

SUMMARY OF THE INVENTION

The present invention provides a system and methods to allow multiple stations in geographically dispersed locations to monitor and track vehicle repair record and service status information. In a service area comprised of a number of geographically-bounded service regions, at least one regional communications terminal is provided in communication with a plurality of local communications terminals. Each local communications terminal is typically located at a separate repair or service location having responsibility for servicing the vehicles temporally located within the region.

The present invention provides a system and methods for maintaining and disseminating vehicle service information within and among regions. Vehicle service events are entered into a vehicle tracking system and maintained using a vehicle status database. Database files are exchanged among regional communications terminals and with a central equipment manager in order to provide timely and accurate dissemination of service status.

A further aspect of the present invention is the sharing of vehicle service status with marketing offices and retail locations. This enables personnel at such locations to understand the repair history of a particular vehicle.

A still further aspect of the present invention is the ability to predict vehicle availability or time of return from service. The system and methods according to the present invention provide an availability prediction for operations personnel to allocate fleet vehicles while taking account of anticipated vehicle demand.

Other advantages and objectives of the present invention are apparent upon inspection of this specification and the drawings appended thereto.

BRIEF DESCRIPTION OF THE DRAWINGS

FIG. 18 is a preferred report generated by a local communications terminal according to the present invention showing a portion of the out-of-service vehicles whose service has not been completed within a projected repair time;

FIG. 19 is a preferred display of a calculated repair/service time provided by a local communications terminal according to the present invention; and FIG. 20 is a preferred down equipment report generated by a local communications terminal and a regional communications terminal according to the present invention displaying information contained in a vehicle history file.

DETAILED DESCRIPTION OF THE PREFERRED EMBODIMENTS

The present invention provides a system and methods to allow multiple stations in geographically dispersed locations to monitor and track vehicle repair record and service status information regardless of vehicle location.

Figure 1:
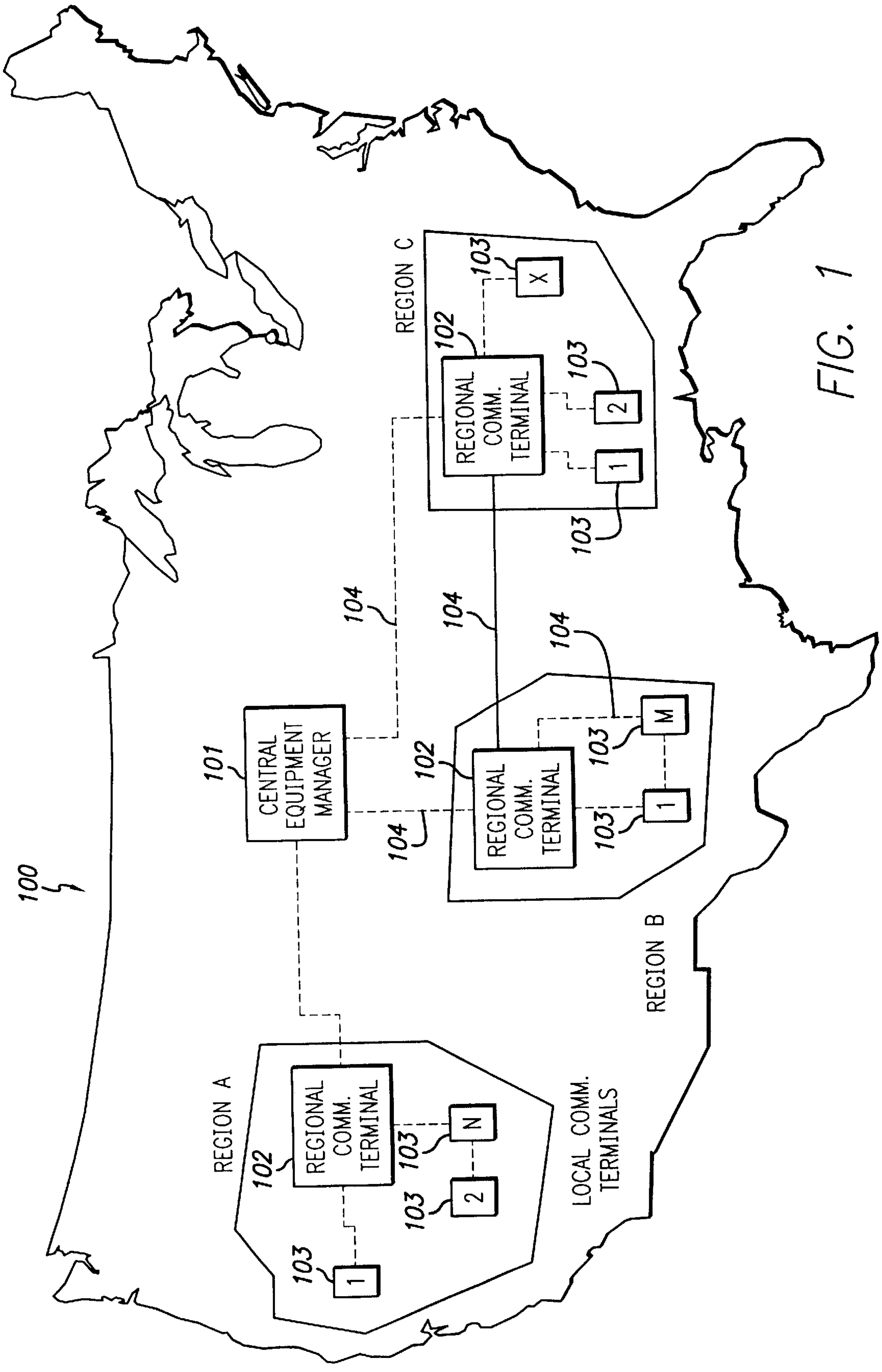
FIG. 1 is a block diagram depicting the overall arrangement of a preferred embodiment of a vehicle tracking system according to the present invention.

FIG. 1 illustrates the overall arrangement of a preferred embodiment of a vehicle tracking system 100 according to the present invention. Referring now to FIG. 1, vehicle tracking system 100 includes a central equipment manager 101, regional communications terminals 102, and local communications terminals 103. Preferably, a single regional communications terminal 102 is allocated to support a given particularly-bounded geographical region. For example, FIG. 1 shows three regions (Regions A, B, and C) each having a regional communications terminal 102. However, one or more additional regional communications terminals 102 may provide backup communications and processing for one or more regions.

Each regional communications terminal 102 is preferably located in a regional company office or other such location having responsibility for maintaining and servicing the vehicles within a particular geographical region or regions. Each local communications terminal 103 is preferably located in a repair and service station having responsibility for repairing broken-down or out-of-service vehicles, as well as for providing routine service and preventive maintenance, for vehicles temporally within that region. A local communications terminal 103 communicates with a regional communications terminal 102 within its local region; however, a given local communications terminal 103 may communicate with one or more regional communications terminals 102 within or outside of its local region. Regional communications terminal 102 is thus provided in shared communication with multiple local communications terminals 103.

Figure 2:
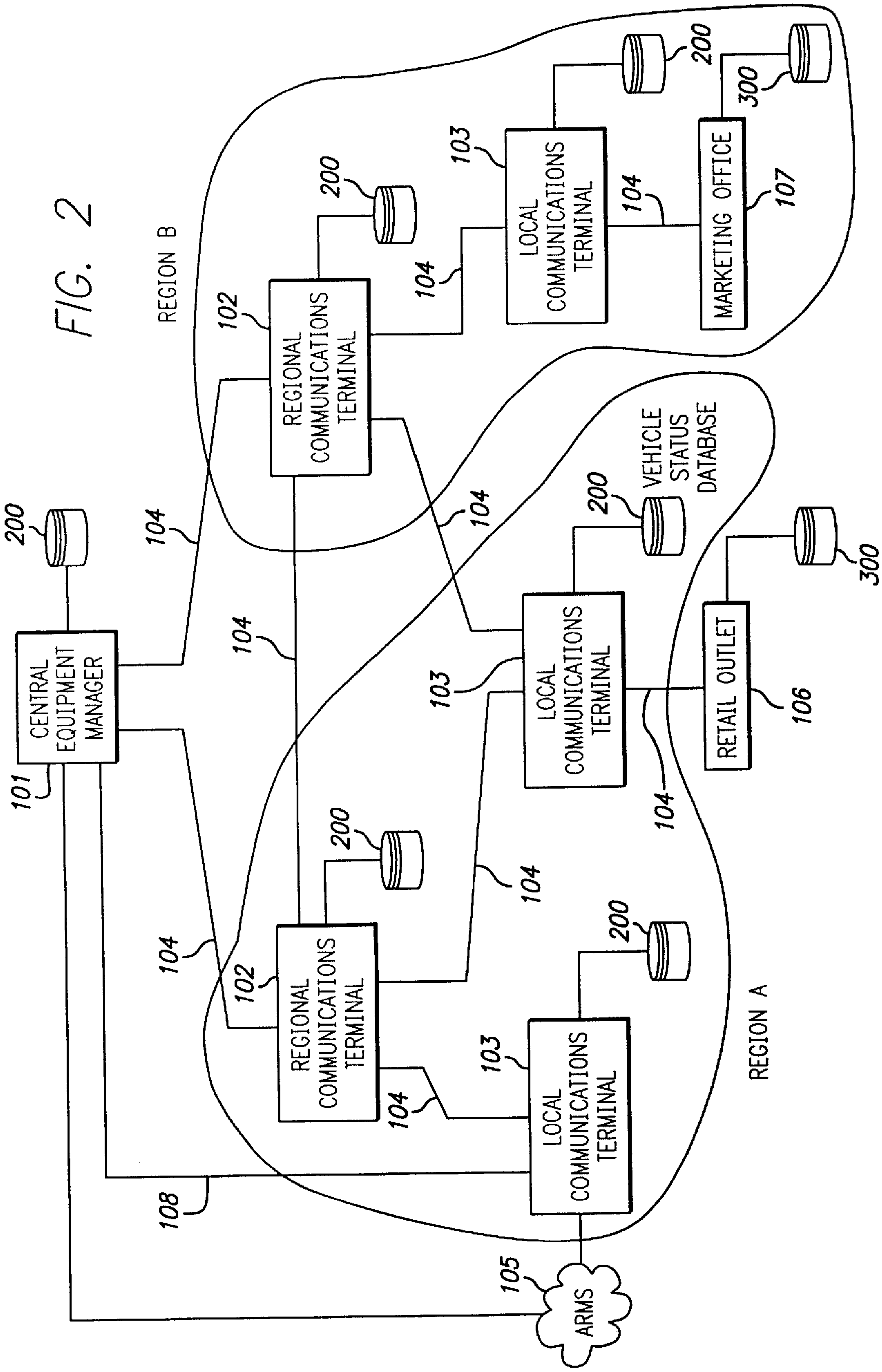
FIG. 2 is a functional block diagram of a preferred embodiment of a vehicle tracking system according to the present invention.

FIG. 2 further illustrates the logical relationships among these elements of vehicle tracking system 100. Referring now to FIG. 2, each regional communications terminal 102 communicates with central equipment manager 101. Central equipment manager 101 maintains at a single office location vehicle service status information for all regions, and periodically disseminates this information to all regional communications terminals 102 and local communications terminals 103.

In a preferred embodiment, each regional communications terminal 102 communicates with central equipment manager 101 and multiple local communications terminals 103 using a frame relay network 104. Frame relay is a packet-switched protocol used for connecting terminals to a Wide Area Network (WAN) supporting T-1 or T-3 data rates. Alternatively, frame relay network 104 comprises public switched or private telecommunications circuits such as telephone landlines, the Internet, or wireless transmission systems including, but not limited to, personal communications services, cellular data, satellite, or point-to-point microwave communications. Regional communications terminals 102 are interconnected via frame relay network 104.

Referring again to FIG. 2, vehicle tracking system 100 includes a vehicle status database 200 operably coupled to each local communications terminal 103 and regional communications terminal 102. A vehicle status database 200 is also operably coupled to central equipment manager 101. In a preferred embodiment, central equipment manager 101 is a mainframe computer system, such as a DEC® VAX™ or IBM® Model 3070 system, having a frame relay gateway and an Internet interface. Alternatively, central equipment manager 101 is implemented according to a client-server architecture. Central equipment manager 101 preferably communicates with regional communications terminals 102 via frame relay network 104 and with local communications terminal 103 via Internet interface 108.

Central equipment manager 101 transmits a multiple breakdown advisory 215 (see FIG. 6) to all local communications terminals 103 and all regional communications terminals 102, preferably once per 24-hour period. Central equipment manager 101 transmits a multiple breakdown advisory 215 to local communications terminals 103 as a database file via File Transfer Protocol (FTP) using Internet interface 108. Preferably, central equipment manager 101 transmits multiple breakdown advisory 215 to regional communications terminals 102 as a database file via frame relay network 104. Users at repair/service locations having local communications terminal 103 are able to withhold rental of vehicles listed on multiple break-down advisory 215 if, in the user's judgment, the vehicle's repair history indicates a high likelihood of break-down during an extended trip such as, for example, an inter-regional or cross-country trip. This allows an operator of vehicle tracking system 100 to achieve higher overall customer satisfaction and to save money on operating costs such as vehicle towing.

Figure 17:
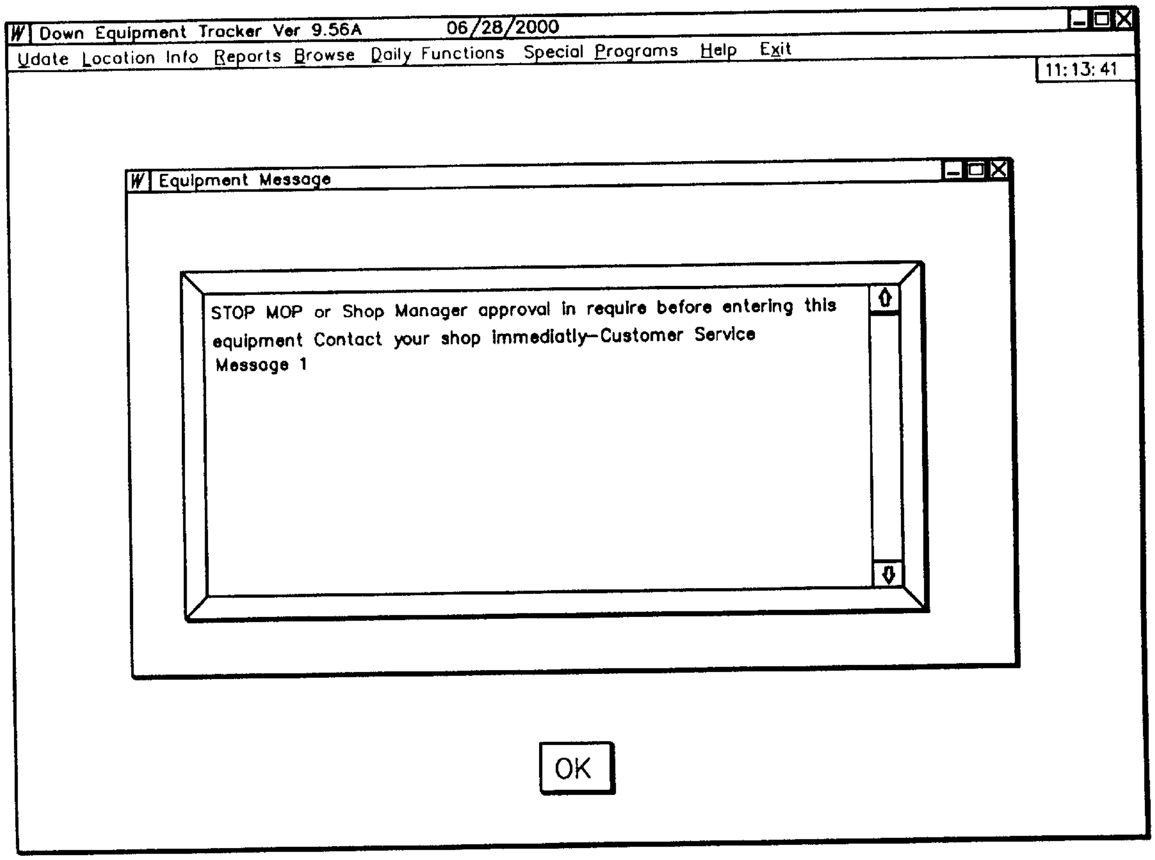
FIG. 17 is a preferred advisory warning generated by a local communications terminal and a regional communications terminal according to the present invention.

Preferably, multiple breakdown advisory 215 is also used to indicate additional conditions affecting the status of a given vehicle such as, but not limited to, a stolen or missing vehicle. For example, FIG. 17 illustrates a preferred advisory warning generated by local communications terminal 103 and regional communications terminal 102 in response to receiving a multiple breakdown advisory 215 from central equipment manager 101 providing an indication of a stolen or missing vehicle.

Referring again to FIG. 2, a local communications terminal 103 typically provides vehicle service status file 205 to a single regional communications terminal 102. However, as shown in FIG. 2, local communications terminal 103 may alternatively provide vehicle service status file 205 to multiple regional communications terminals 102 located in different regions. The latter situation may occur, for example, when local communications terminal 103 is located sufficiently physically proximate to two or more regional communications terminals 102 such that it is advantageous for that repair/service location to support vehicles within the control span of either or both regional offices.

Referring again to FIG. 2, local communications terminal 103 includes an interface for receiving an entity master list 280 (see FIG. 6) transmitted from central equipment manager 101. Preferably, central equipment manager 101 transmits entity master list 280 using FTP via Internet interface 108. The entity master list 280 is useful for identifying the current set of regional company offices, retail locations, and marketing offices.

Local communications terminal 103 includes an interface to an Automated Repair Management System (ARMS) 105 for receiving vehicle history file 210 transmitted from central equipment manager 101. In a preferred embodiment, ARMS 105 is a frame relay network. Central equipment manager 101 preferably transmits vehicle history file 210 to local communications terminals 103 as a database file via File Transfer Protocol (FTP) using ARMS 105.

Referring again to FIG. 2, local communications terminal 103 preferably includes interfaces to retail outlet 106 and marketing office 107 using frame relay network 104. Local communications terminal 103 transmits vehicle service status file 205 to retail outlet 106 and marketing office 107 via frame relay network 104. In a preferred embodiment, retail outlet 106 and marketing office 107 include an availability database 300 containing, without limitation, information concerning the availability status of vehicles in the fleet. Users at retail outlet 106 and marketing office 107 are able to allocate vehicle resources to customers, and to predict equipment availability to customers, using the vehicle repair and service status provided in vehicle service status file 205 and availability database 300.

Figure 3:
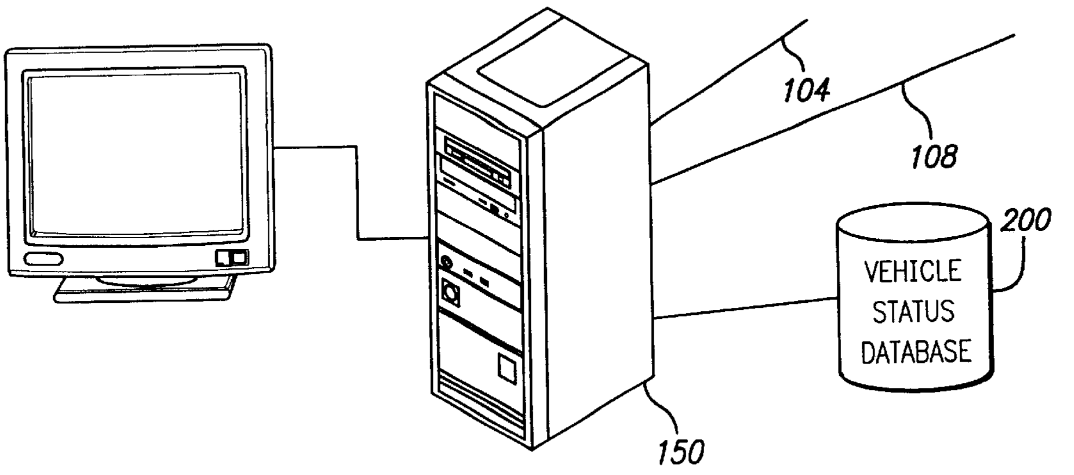
FIG. 3 depicts the components of a preferred implementation of a local communications terminal and a regional communications terminal according to the present invention.

FIG. 3 shows a preferred implementation of local communications terminal 103 and regional communications terminal 102. Local communications terminal 103 and regional communications terminal 102 include a personal computer based server 150 having standard peripherals including monitor, printer (not shown), keyboard and mouse (not shown), and having an interface to a frame relay network 104 and an Internet interface 108, and having a vehicle status database 200. In a preferred embodiment, server 150 is an Intel® Pentium™-based personal computer (PC) running Microsoft® Windows™ operating system software, including Windows NT™ version 4.0. Server 150 executes programmed instructions in accordance with a software application program in order to achieve the functionality described herein. In a preferred embodiment, server 150 application software is written in FoxPro™ version 2.6 for Microsoft® Windows™. In a preferred embodiment, vehicle tracking system 100 includes two independent application programs: one application program for execution at local communication terminal 103, and a second application program for execution at regional communications terminal 102.

Local communications terminal 103 and regional communications terminal 102 include a web browser and electronic mail capability to enable electronic communication using the Internet, including Hypertext Transport Protocol (HTTP), File Transfer Protocol (FTP), and Simple Mail Transfer Protocol (SMTP). In a preferred embodiment, local communications terminal 103 and regional communications terminal 102 use Microsoft® Internet Explorer™ and Outlook™ application software.

In a preferred embodiment, vehicle status database 200 is implemented using FoxPro™ version 2.6 ™ version 7.0. Server 150 interfaces with vehicle status database 200 using FoxPro™ queries and instructions.

Figure 4:
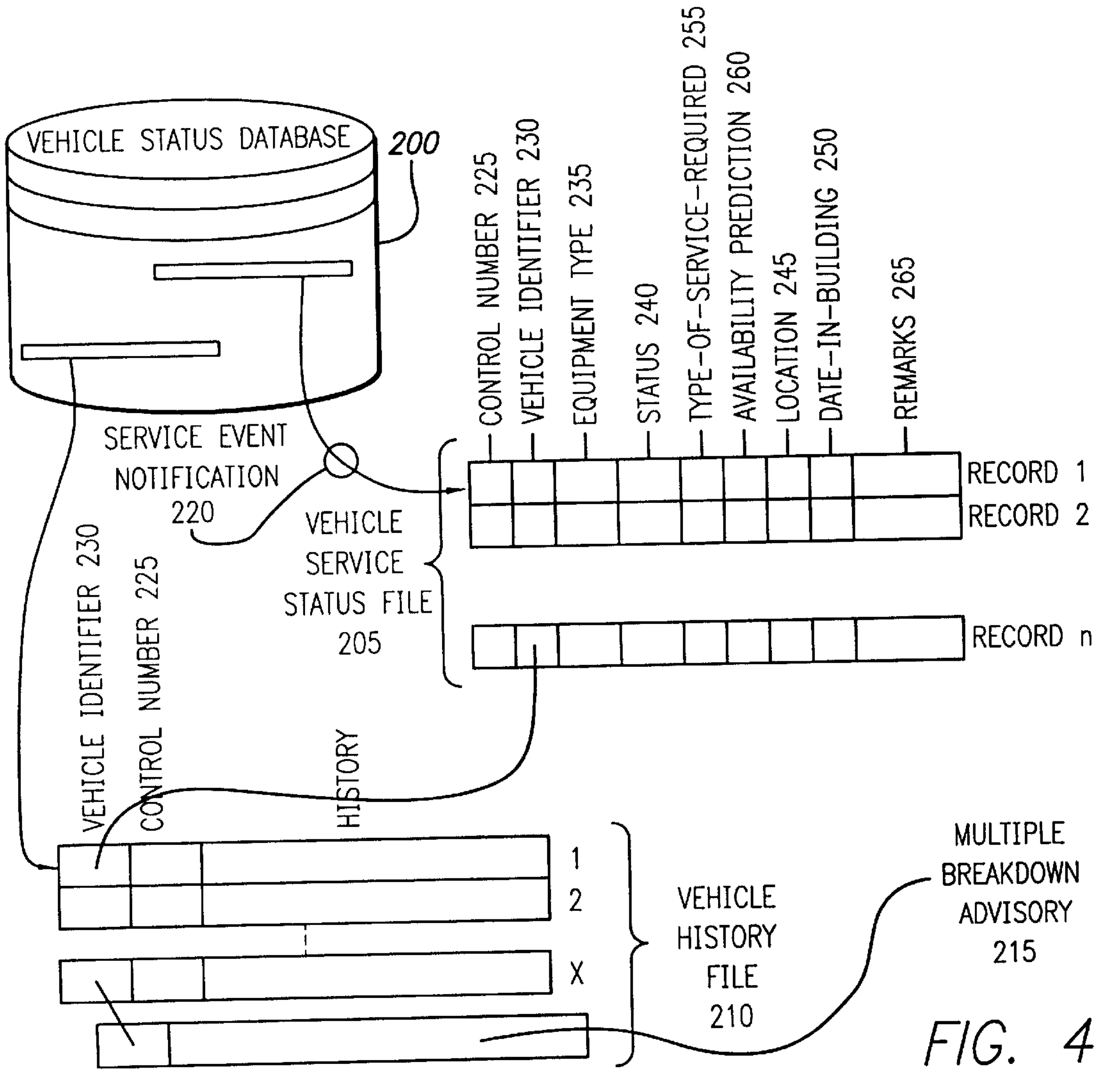
FIG. 4 depicts the contents of a vehicle status database according to a preferred embodiment of the present invention.

FIG. 4 describes the contents of vehicle status database 200. Referring now to FIG. 4, vehicle status database 200 includes one or more vehicle service status files 205, a vehicle history file 210, and multiple breakdown advisory 215.

Figure 6:
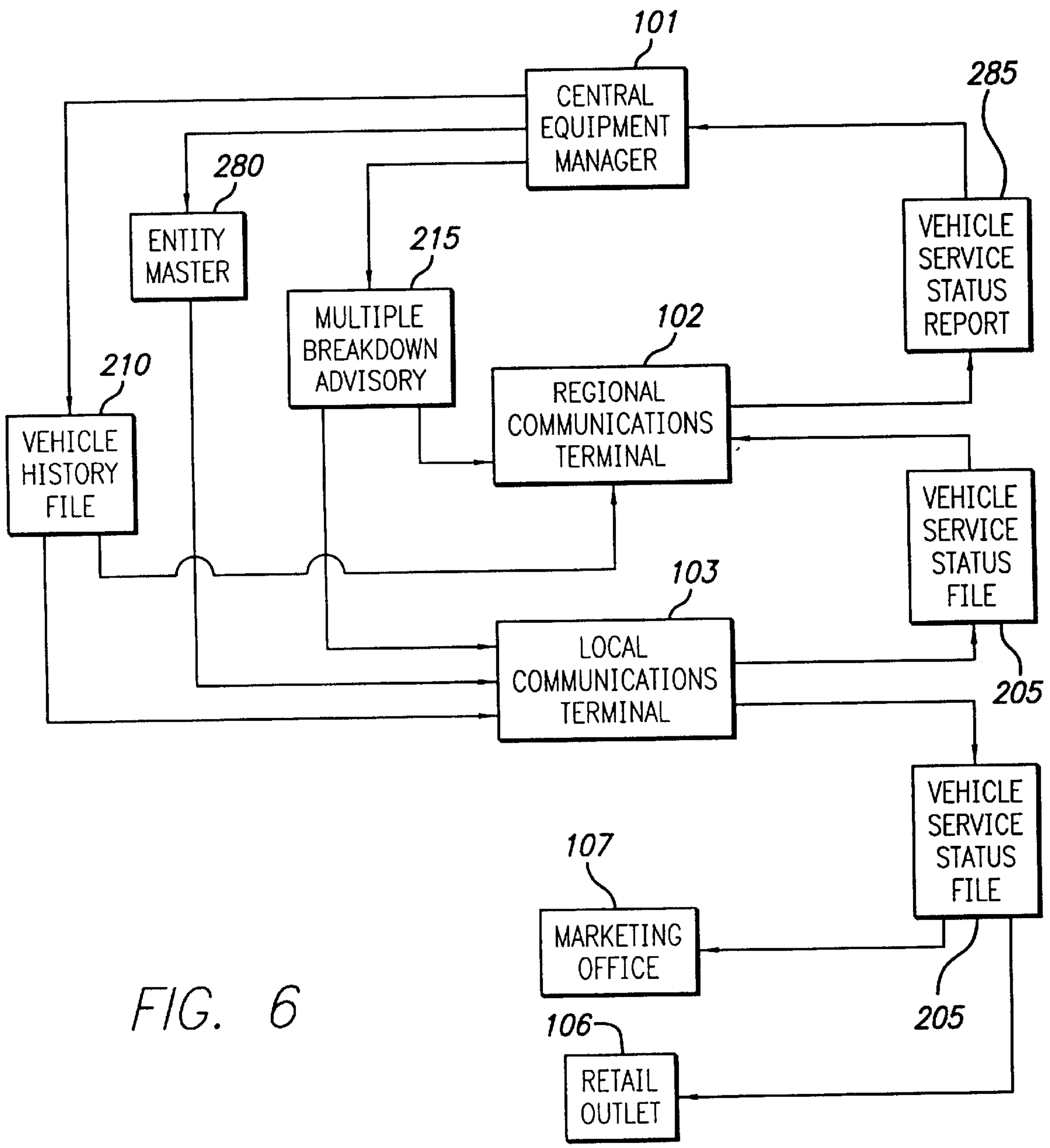
FIG. 6 is an information flow diagram depicting the flow of vehicle repair and service status information throughout a preferred vehicle tracking system.

FIG. 6 illustrates the flow of vehicle repair and service status information comprising vehicle status database 200 throughout vehicle tracking system 100, as described herein.

Vehicle service status file 205 is comprised of one or more service event notifications 220. A service event notification 220 is created or modified by a user, usually a service professional, at a local repair or service location by logging vehicle repair and service information using local communications terminal 103. Referring again to FIG. 4, service event notification 220 may include, for example, a control number 225, a vehicle identifier 230, an equipment type indicator 235, current status 240, location identifier 245, date-in-building indicator 250, type-of-service-required indicator 255, an availability prediction 260, and remarks 265.

In a preferred embodiment, local communications terminal 103 provides for generation of availability prediction 260 by calculating an average repair/service time for the particular location and providing this information to the user. To calculate the average repair/service time, local communications terminal 103 retrieves from vehicle status database 200 service event notifications 220 for repair/service activities accomplished at this service location during the past thirty days. Local communications terminal 103 then computes an average repair/service time by averaging the number of days from date-in-building 250 to closing of the service event notification 220 for each service event notification within the thirty day period. FIG. 19 illustrates a preferred display of the calculated repair/service time provided by local communications terminal 103. Alternatively, a period of time of shorter or longer duration than thirty days is used in calculating the average repair/service time. Preferably, the average repair/service time is calculated daily. Local communications terminal 103 displays the calculated average repair/service time to the user. Local communications terminal 103 further includes an operator interface that allows the user to enter availability prediction 260 using a keyboard, the user having considered a variety of factors including the average repair/service time.

In a first alternative, local communications terminal 103 calculates availability prediction 260 based on, without limitation, the mean-time-to-repair (typically measured in hours) to complete a particular service job for a particular item of equipment. In this alternative embodiment, vehicle status database 200 further includes a set of mean-time-to-repair values indexed by equipment type 235 and type-of-service-required 255. Mean-time-to-repair values are periodically updated in response to changes in the calculated average repair/service time described above. Local communications terminal 103 sets availability prediction 260 equal to the mean-time-to-repair value associated with the particular equipment type 235 and type-of-service-required 255. Local communications terminal 103 may modify availability prediction 260 based upon user-provided factors such as, but not limited to, the service backlog at this location, staffing levels at this location, and parts availability.

In a second alternative embodiment, local communications terminal 103 automatically calculates availability prediction 260 by setting availability prediction 260 equal to the date occurring three business days following the date service event notification 220 is entered into vehicle service database 200. Local communications terminal 103 further includes an operator interface that allows a user to modify availability prediction 260 by manually entering a different projected availability date using a keyboard.

Local communications terminal 103 stores availability prediction 260 with its associated service event notification 220 record using vehicle status database 200. In a preferred embodiment, availability prediction 260 is included in the service event notification 220 record as shown in FIG. 4. Alternatively, the service event notification 220 record includes a pointer to a memory location containing availability prediction 260.

Figure 5:
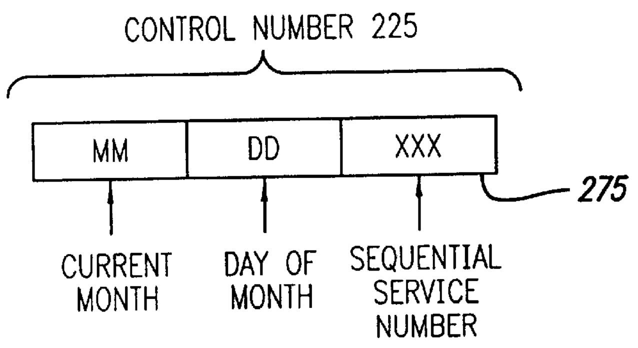
FIG. 5 depicts a preferred format for a control number for use with a vehicle tracking system according to the present invention.

FIG. 5 shows a preferred control number 225 for use with vehicle tracking system 100. Referring now to FIG. 5, control number 225 is formed by sequentially concatenating two numeric digits corresponding to the current month, two numeric digits corresponding to the current day of the month, and a three-digit sequential service number 275. Service number 275 is preferably determined by local communications terminal 103 at the time the user enters a new service event notification 220. A distinct control number 225 is provided for each service request for an individual vehicle. Control number 225 thus patently conveys to an observer an indication of: (1) the date that a particular service event notification 220 was created for the associated vehicle, and (2) the order in which that service event notification 220 was created with respect to other service event notifications 220 logged by that local communications terminal 103 on a particular date.

Referring again to FIG. 4, vehicle service status file 205 is comprised of the service event notifications 220 entered or modified at a local communications terminal 103 since the last time vehicle service status file 205 was uploaded to regional communications terminal 102. In a preferred embodiment, vehicle service status file 205 is created by local communications terminal 103 immediately prior to uploading it to regional communications terminal 102. Local communications terminal 103 creates vehicle service status file 205 by formulating a query requesting retrieval all of the service event notifications 220 entered or modified (e.g., service ticket closed at the completion of repair, service location changed) since the time of the most recent upload. The retrieved service event notification 220 records are then stored as vehicle service status file 205 using vehicle status database 200.

Referring again to FIG. 6, vehicle service status file 205 is then uploaded to regional communications terminal 102 using frame relay network 104. In a preferred embodiment, local communications terminal 103 automatically uploads vehicle status file 205 periodically at a frequency of once every 30 minutes. Alternatively, the frequency of upload can be decreased to minimize the number of transmissions or increased to approach real-time notification. Personnel at regional company offices use regional communications terminal 102 to determine equipment status and location in order to manage reservations. For example, if equipment is scheduled to be serviced in a particular region, personnel at other regions will not reserve that vehicle for an inter-regional trip.

Regional communications terminal 102 aggregates each of the vehicle status files 205 received from local communications terminals 103 into a vehicle service status report 285. Regional communications terminal 102 then transmits vehicle service status report 285 to central equipment manager 101. In a preferred embodiment, regional communications terminal 102 automatically uploads vehicle service status report 285 periodically at a frequency of once every 30 minutes. In a preferred embodiment, vehicle service status report 285 is uploaded from regional communications terminal 102 using frame relay network 104.

Vehicle history file 210 comprises all of the service event notifications 220 associated with a particular vehicle identifier 230, preferably including all service event notifications 220 occurring in the previous twelve-month period.

Vehicle history file 210 is received by local communications terminal 103 and regional communications terminal 102 from central equipment manager 101 and stored using vehicle status database 200. FIG. 20 illustrates a preferred down equipment report generated by local communications terminal 103 and regional communications terminal 102 displaying information contained in vehicle history file 210 received from central equipment manager 101. Vehicle history file 210 preferably includes multiple breakdown advisory 215, a separate indication also provided by central equipment manager 101. In a preferred embodiment, multiple breakdown advisory 215 is provided as a separate record of vehicle history file 210. Users of vehicle tracking system 100 are able to detect root cause problems or other systemic problems based on the pattern of recurring repair/service actions for a particular vehicle provided by vehicle history file 210. For example, a series of dead battery service events can be indicative of an underlying electrical problem. Local communications terminal 103 and regional communications terminal 102 provide a history search capability to allow a user to review service event notifications 220 for a particular vehicle occurring over a period of time which is preferably the previous twelve-month period.

Figure 7A:
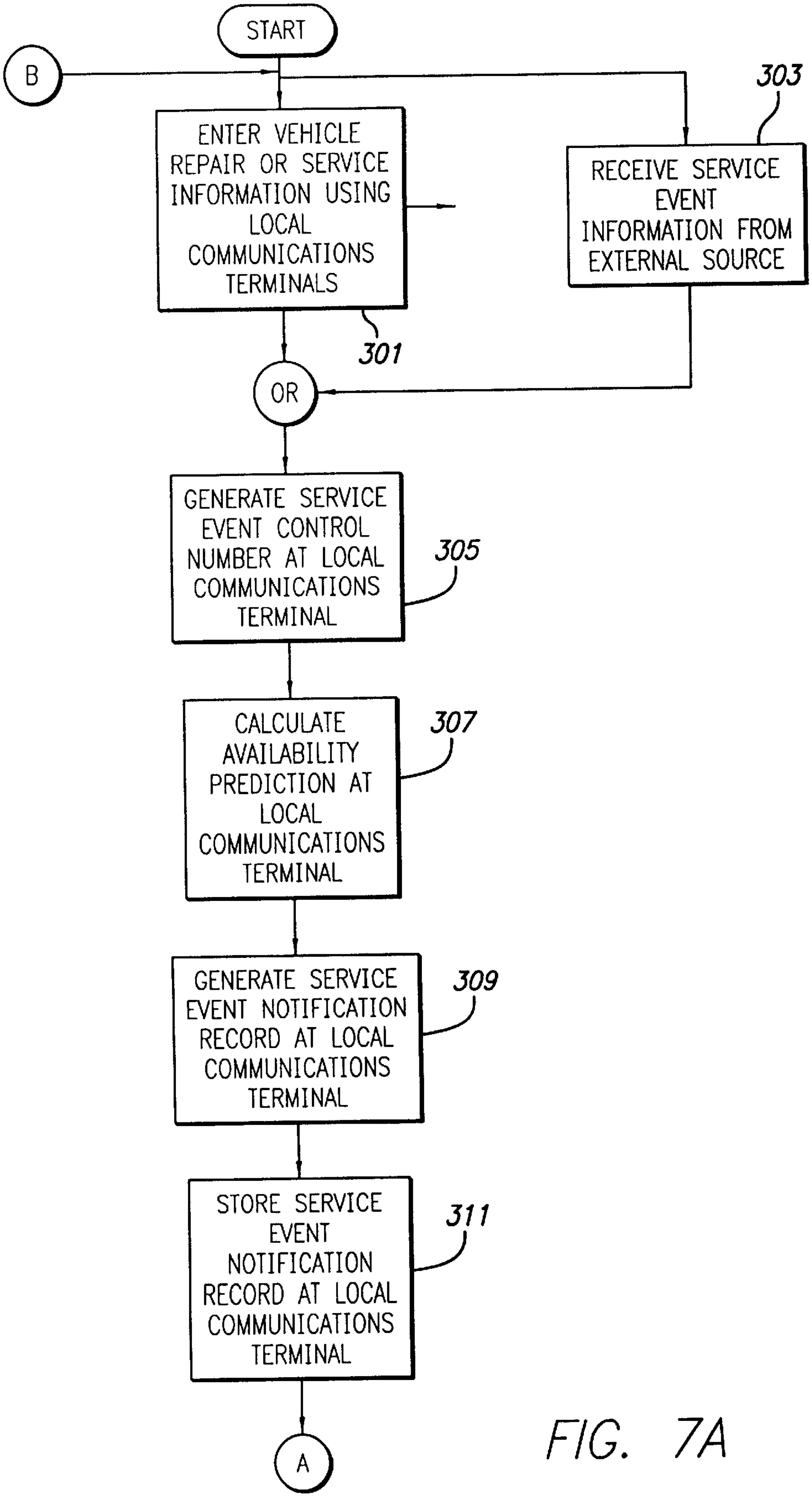
FIGS. 7A and 7B depict processing accomplished by a local communications terminal in a preferred embodiment of the present invention.
Figure 7B:
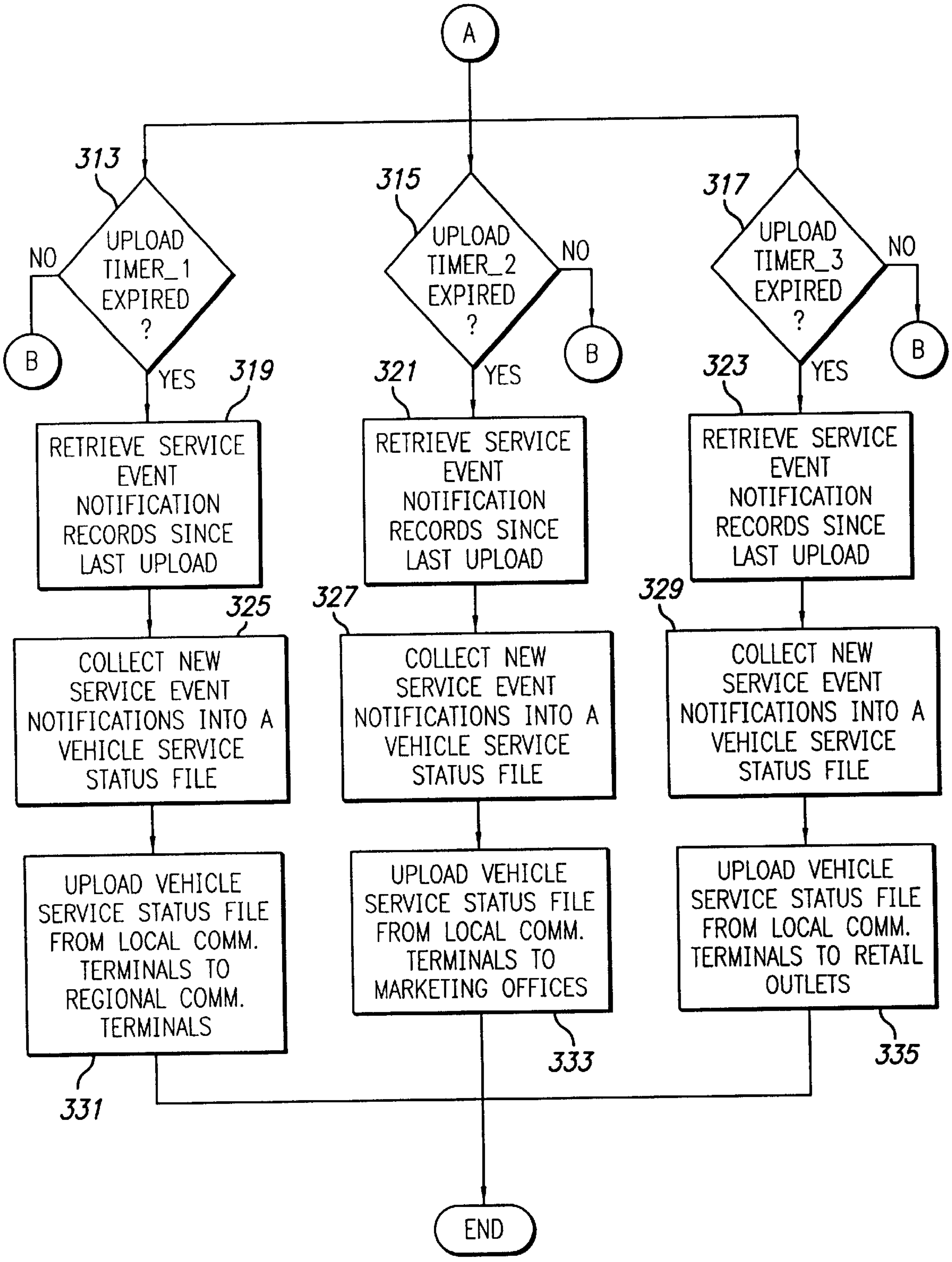

FIGS. 7A and 7B describe the processing accomplished by local communications terminal 103 in a preferred method of managing a fleet of vehicles, and vehicle repair record and service status information, in vehicle tracking system 100 (see FIG. 1) having multiple geographically remote service locations, according to the present invention.

Figure 10:
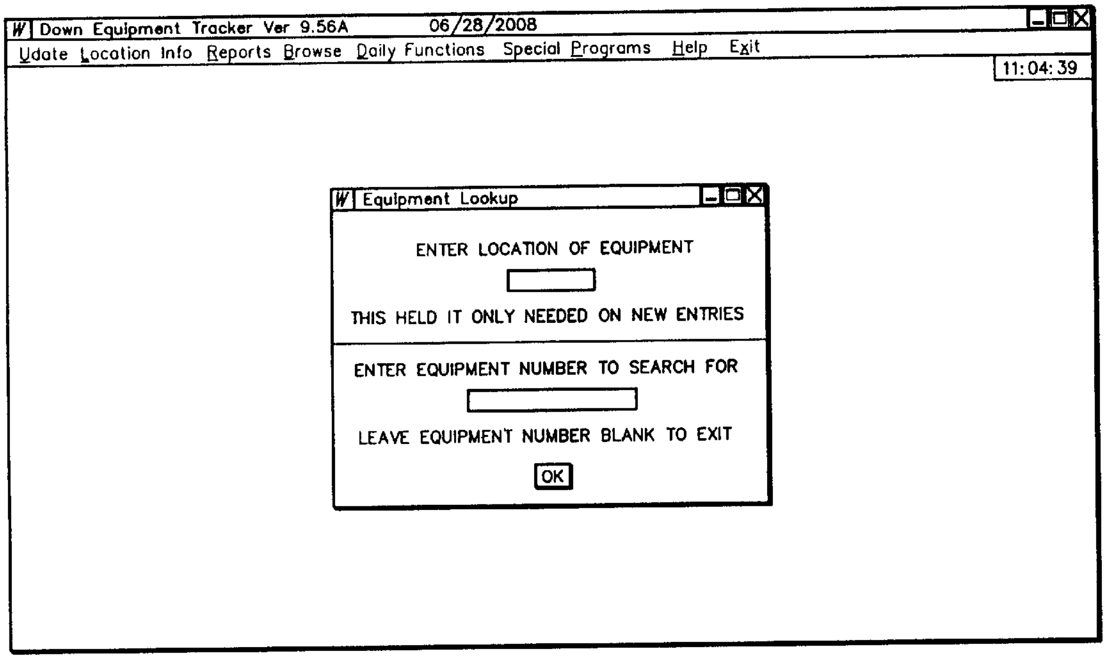
FIG. 10 is a preferred user interface by which a user enters equipment/location validation information at a local communications terminal according to the present invention.
Figure 11:
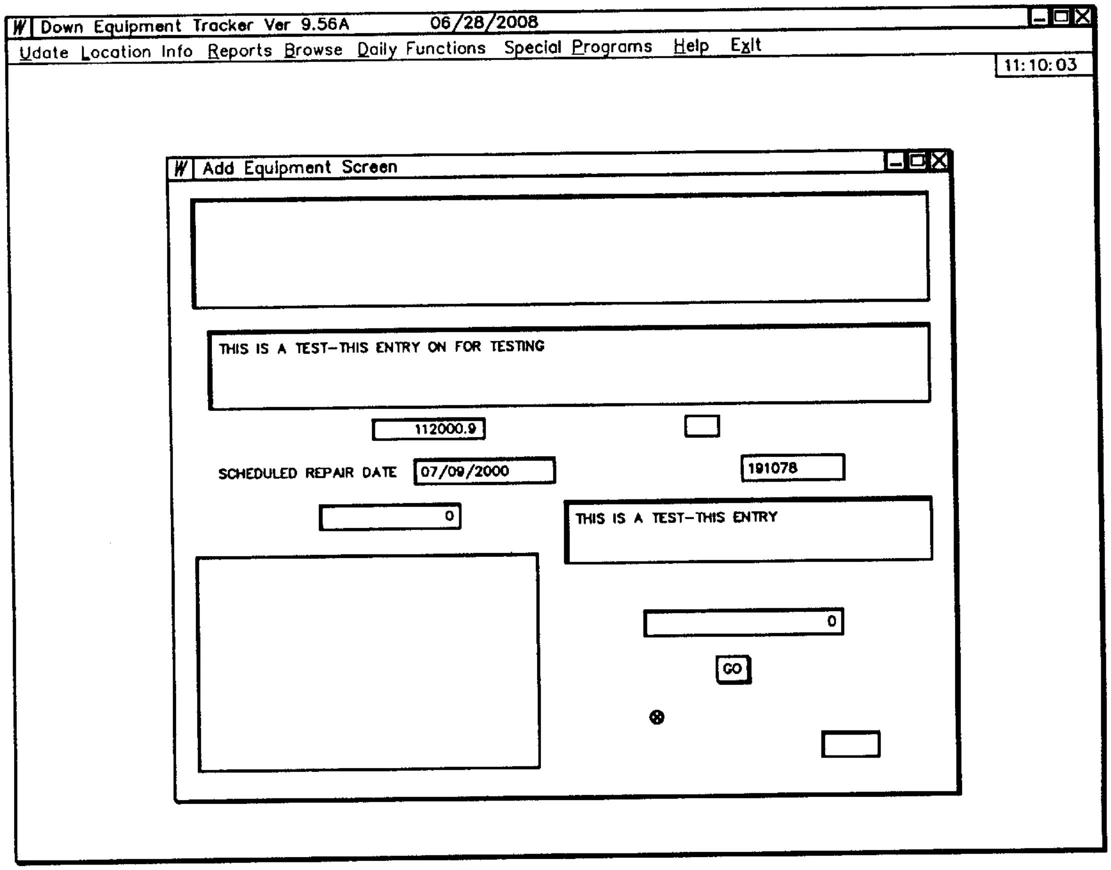
FIG. 11 is a preferred user interface for a local communications terminal according to the present invention by which a user may enter portions of vehicle repair/service event information.
Figure 12:
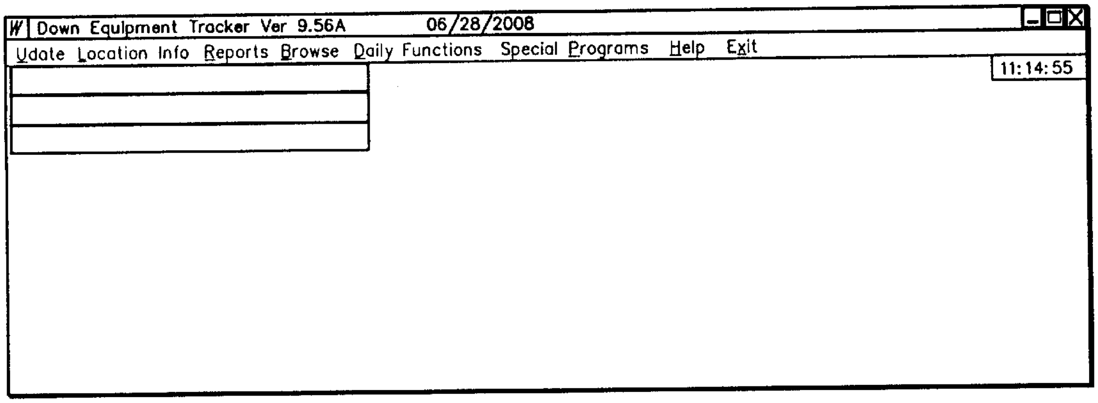
FIG. 12 is a preferred user interface for a local communications terminal according to the present invention by which a user may modify portions of vehicle repair/service event information.

Referring now to FIG. 7A, a user of vehicle tracking system 100 uses local communications terminal 103 to enter and log vehicle repair and service information (block 301). FIG. 10 illustrates a preferred user interface for local communications terminal 103 by which a user enters equipment/location validation information. Specifically, upon a determination of a repair or service action being required for a particular vehicle, a user enters information specific to the repair/service event using local communications terminal 103. Referring again to FIG. 4, such user-entered repair/service event information includes, but is not limited to, vehicle identifier 230, equipment type 235, current status 240, type of service required 255, location 245, date_in_building 250, and any specific explanatory remarks 265. FIG. 11 depicts a preferred user interface for local communications terminal 103 by which a user may enter portions of vehicle repair/service event information. FIG. 12 depicts a preferred user interface for local communications terminal 103 by which a user may modify portions of vehicle repair/service event information.

In a typical application, local communications terminal 103 is located in a repair and service station having responsibility for repairing and servicing vehicles. Referring again to FIG. 7A, a user, such as a service professional, preferably enters the repair/service event information using an interactive data entry screen and keyboard/mouse provided by local communications terminal 103. For example, repair/service event information may be manually entered from a written work order, or, alternatively, in conjunction with creation of a written work order.

Alternatively, local communications terminal 103 receives repair/service event information from an external source via Internet interface 108 (block 303). External sources include, but are not limited to, a mobile repair unit, a remote repair or service location, or other location not equipped with local communications terminal 103. In this case, an external source transmits vehicle repair/service information to local communications terminal 103 using an electronic message such as, for example, an email message, over Internet interface 108.

Figure 13:
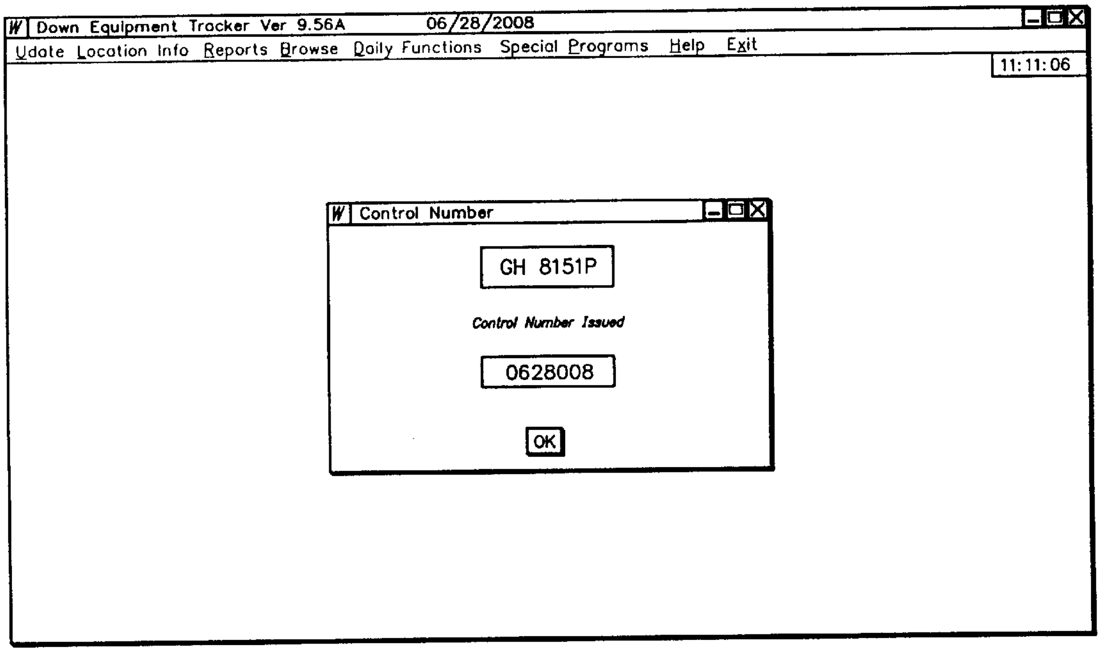
FIG. 13 is a preferred user interface by which a local communications terminal according to the present invention displays a control number to a user.

After entry or receipt of vehicle repair/service information, local communications terminal 103 generates control number 225 for a new service event notification 220 as described herein in reference to FIG. 5 (block 305). FIG. 13 illustrates a preferred user interface by which local communications terminal 103 displays the generated control number 225 to a user. Local communications terminal 103 also generates availability prediction 260 as described elsewhere herein (block 307). In a preferred embodiment, control number 225 is generated per block 305 prior to availability prediction 260 being generated per block 307; however, these two operations may be accomplished without regard to any particular sequence, or in parallel as well. After obtaining vehicle repair/service information in blocks 301 or 303, generating control number 225 in block 305, and generating availability prediction 260 in block 307, local communications terminal 103 creates service event notification 220 using this information as shown in FIG. 4 (block 309).

After creating service event notification 220, each such new service event notification 220 is stored in the local vehicle status database 200 operably coupled to the local communications terminal 103 that generated that service event notification 220 (block 311). FIGS. 14A through 14D illustrate a preferred user interface for local communications terminal 103 by which a user may request to receive a variety of service event reports generated by local communications terminal 103 using the vehicle repair/service information contained in vehicle repair database 200.

Figure 14A:
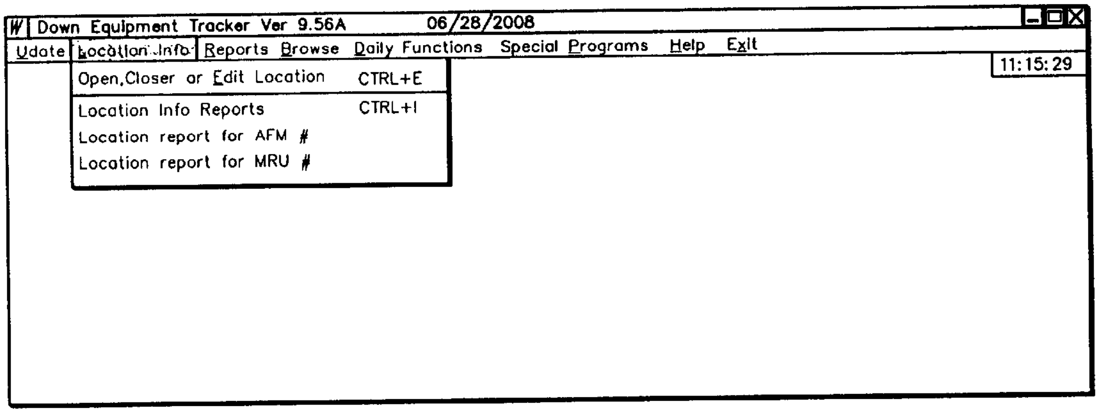
FIG. 14A is a preferred user interface for a local communications terminal according to the present invention providing the capability for a user to edit location information and view location-related reports.

Referring now to FIG. 14A, local communications terminal 103 provides the capability for a user to edit location information and view location-related reports.

Figure 14B:
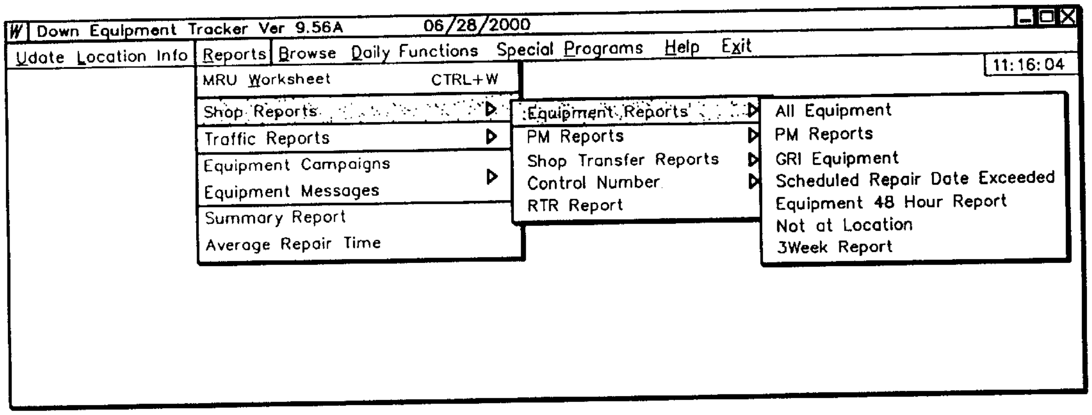
FIG. 14B is a preferred user interface for a local communications terminal according to the present invention providing the capability for a user to view a variety of repair shop oriented reports.

Referring now to FIG. 14B, local communications terminal 103 provides the capability for a user to view a variety of repair shop oriented reports, including reports indicating various aspects of equipment disposition and availability at this location, including equipment for which the scheduled repair date has been exceeded. FIG. 18 illustrates a preferred report generated by local communications terminal 103 showing a portion of the out-of-service vehicles whose service has not been completed within a projected repair time.

Figure 14C:
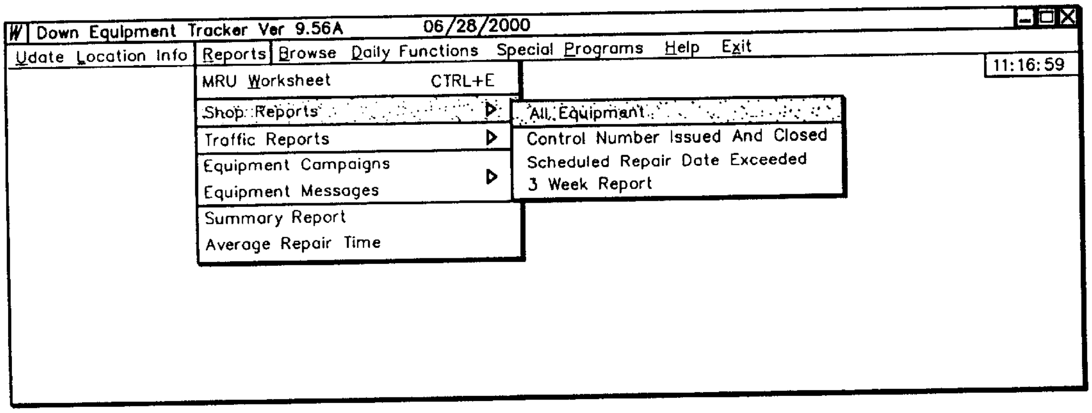
FIG. 14C is a preferred user interface for a local communications terminal according to the present invention providing the capability for a user to view a variety of traffic reports.

Referring now to FIG. 14C, local communications terminal 103 provides the capability for a user to view a variety of traffic reports.

Figure 14D:
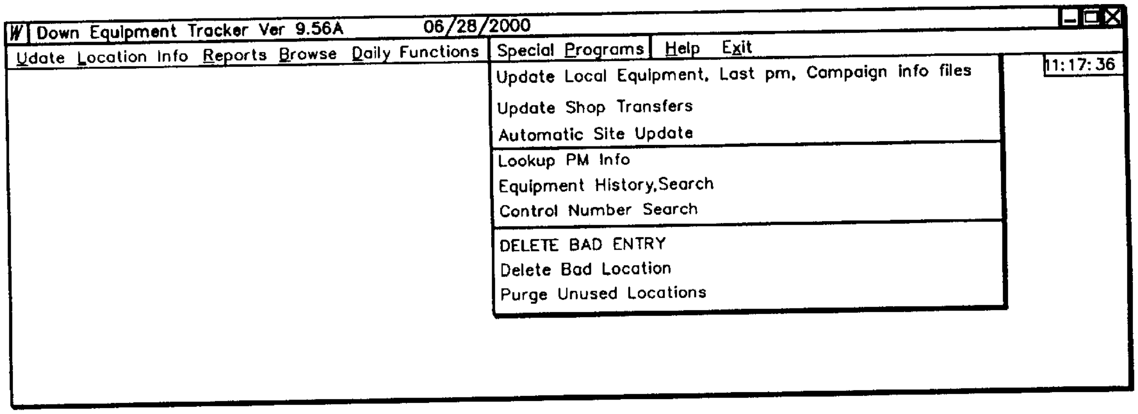
FIG. 14D is a preferred user interface for a local communications terminal according to the present invention providing the capability for a user to view a variety of special programs reports.

Referring now to FIG. 14D, local communications terminal 103 provides the capability for a user to view a variety of special programs reports, including campaign information (received from, for example, a particular vehicle manufacturer), equipment history search, control number search, and shop transfers.

Referring now to FIG. 7B, service event notification 220 processing as described with respect to FIG. 7A continues as required at local communications terminals 103 (reference blocks 313, 315, and 317). However, new service event notifications 220 are periodically uploaded to regional communications terminal 102 (block 331), marketing offices 107 (block 333), and retail outlets 106 (block 335). Local communications terminal 103 maintains a series of software-implemented upload timers used to determine when the current set of new service event notifications 220 are collected and uploaded to each of these destination nodes. In a preferred embodiment, a first timer, TIMER_1, is used to determine when local communications terminal 103 uploads the current set of new service event notifications 220 to regional 10. communications terminal 102 (block 313). Another timer, TIMER_2, is used to determine when local communications terminal 103 uploads the current set of new service event notifications 220 to marketing office 107 (block 315). A third timer, TIMER_3, is used to determine when local communications terminal 103 uploads the current set of new service event notifications 220 to retail outlets 106 (block 317).

In a preferred embodiment, local communications terminal 103 employs three separate upload timers each having independent expiration times but each being set to a value of approximately 30 minutes. The timer values are each independently modifiable by the user. In a first alternative embodiment, a single timer may be used to effect periodic uploading of the current set of new service event notifications 220 to regional communications terminal 102, marketing offices 107, and retail outlets 106. In a second alternative embodiment, service event notification 220 upload is accomplished aperiodically in response to the occurrence of one or a combination of external events, or upon receiving an upload request from the destination node.

Referring again to FIG. 7B, upon the expiration of upload TIMER_1 (block 313), local communications terminal 103 retrieves from its local vehicle status database 200 the set of service event notifications 220 entered since the time of the last upload action associated with TIMER_1 (block 319). In a preferred embodiment, this is accomplished by formulating a database query to retrieve service event notifications 220 having entry dates later in time than the most recently accomplished upload action associated with TIMER_1. This database query is then transmitted to vehicle status database 200. Vehicle status database 200 responds by providing to local communications terminal 103 the set of service event notifications 220, if any, meeting the query criteria.

Local communications terminal 103 gathers the set of service event notifications 220 from block 319 into a vehicle service status file 205 (block 325) as described in FIG. 4. In block 331, local communications terminal 103 then uploads vehicle service status file 205 to regional communications terminal 102 via Frame relay network 104. Similarly, upon the expiration of upload TIMER_2 (block 315), local communications terminal 103 retrieves from its local vehicle status database 200 the set of service event notifications 220 entered since the time of the last upload action associated with TIMER_2 (block 321). Local communications terminal 103 gathers the set of service event notifications 220 from block 321 into a vehicle service status file 205 (block 327). In block 333, local communications terminal 103 then uploads vehicle service status file 205 to marketing office 107 via frame relay network 104.

Further, upon the expiration of upload TIMER_3 (block 317), local communications terminal 103 retrieves from its local vehicle status database 200 the set of service event notifications 220 entered since the time of the last upload action associated with TIMER_3 (block 323). Local communications terminal 103 gathers the set of service event notifications 220 from block 323 into a vehicle service status file 205 (block 329). In block 335, local communications terminal 103 then uploads vehicle service status file 205 to retail outlet 106 via frame relay network 104.

Figure 8:
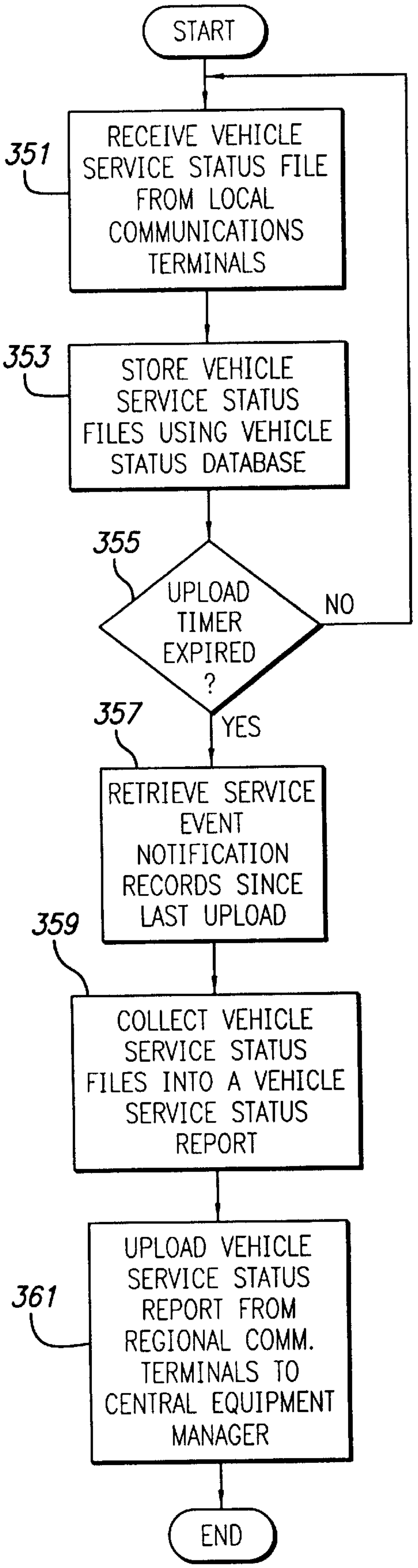
FIG. 8 depicts the processing accomplished by a regional communications terminal in a preferred embodiment of the present invention.

Referring now to FIG. 8, regional communications terminal 102 receives vehicle service status file 205 from one or more local communications terminals 103 via frame relay network 104 (block 351). Upon receiving vehicle service status file 205, regional communications terminal 102 stores vehicle service status file 205 using its local vehicle status database 200 (block 353).

Regional communications terminal 102 maintains a software-implemented upload timer to determine when the current set of new vehicle service status files 205 are to be collected and uploaded to central equipment manager 101 (block 355). In a preferred embodiment, regional communications terminal 102 upload timer is set to a value of approximately 30 minutes. The timer value may be modified as required by the user. Alternatively, vehicle service status file upload is accomplished aperiodically in response to the occurrence of one or a combination of external events, or upon receiving a request for upload from central equipment manager 101.

Upon the expiration of the upload timer (block 355), regional communications terminal 102 retrieves from its local vehicle status database 200 the set of vehicle service status files 205 entered since the time of the last upload action (block 357). In a preferred embodiment, this is accomplished by formulating a database query to retrieve vehicle service status files 205 having receipt dates later in time than the most recently accomplished upload action. This database query is then transmitted to vehicle status database 200. Vehicle status database 200 responds by providing to regional communications terminal 102 the set of vehicle service status files 205, if any, meeting the query criteria.

Regional communications terminal 102 collects the set of vehicle service status files 205 from block 357 into a vehicle service status report 285 (block 359). In a preferred embodiment, vehicle service status report 285 is a single file formed by sequentially appending the contents (i.e., service event notification 220 records) of each vehicle service status file 205 in a sequence from oldest to newest (with respect to time of receipt). In block 361, regional communications terminal 102 then uploads vehicle service status report 285 to central equipment manager 101 via frame relay network 104.

In a preferred embodiment, local communications terminal 103 and regional communications terminal 102 receive vehicle history file 210, entity master 280, and multiple breakdown advisory 215 from central equipment manager 101 once per 24-hour period.

Figure 9:
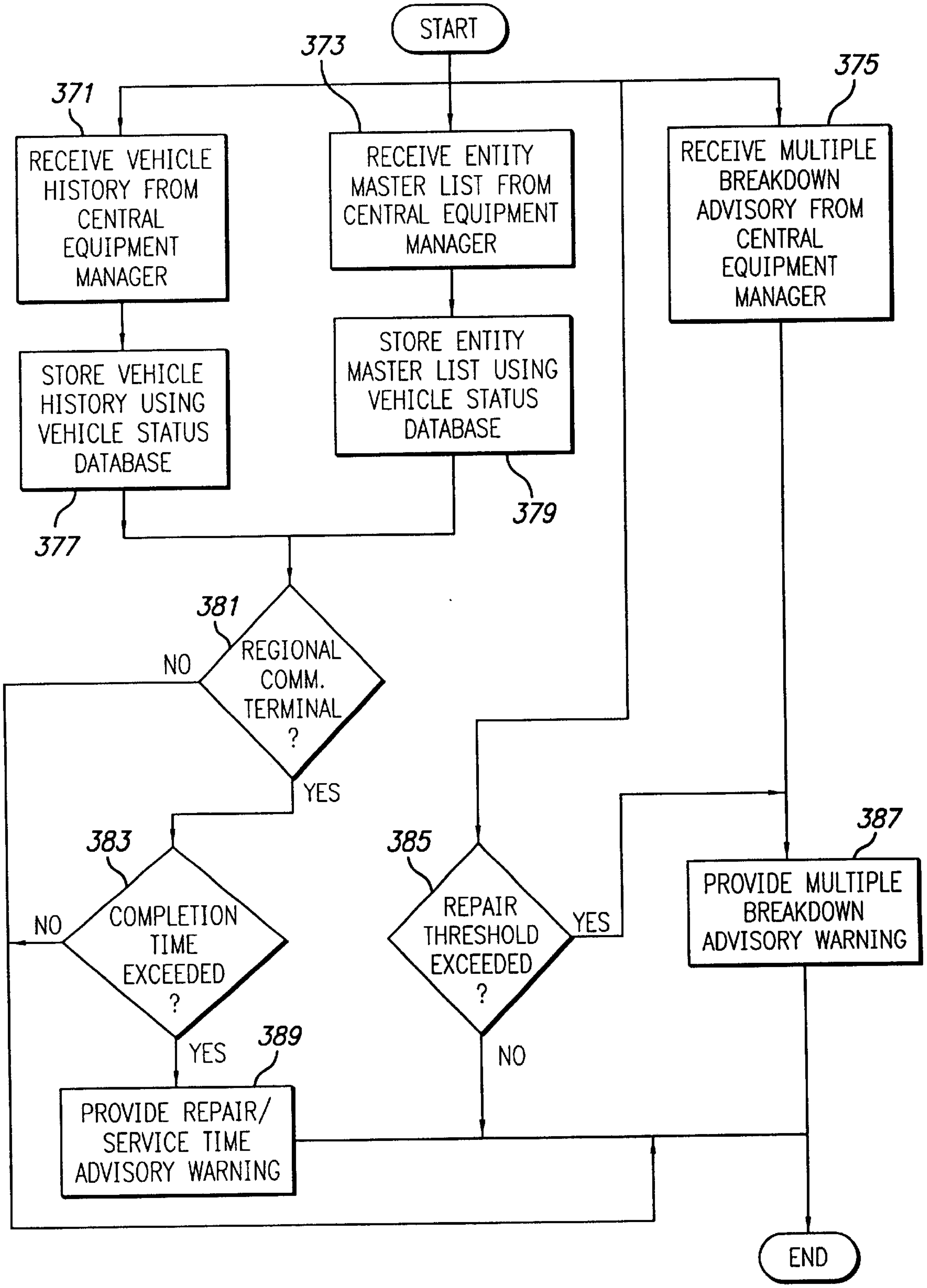
FIG. 9 depicts vehicle repair history processing performed by a local communications terminal and a regional communications terminal according to the present invention.

Referring now to FIG. 9, central equipment manager 101 periodically transmits vehicle history file 210 to local communications terminals 103 and regional communications terminals 102 using electronic network 105. Electronic network 105 may be referred to as an Automated Repair Management System (ARMS). Local communications terminal 103 and regional communications terminal 102 receive vehicle history file 210 (block 371) and store the received vehicle history file 210 using vehicle status database 200 (block 377).

Figure 16:
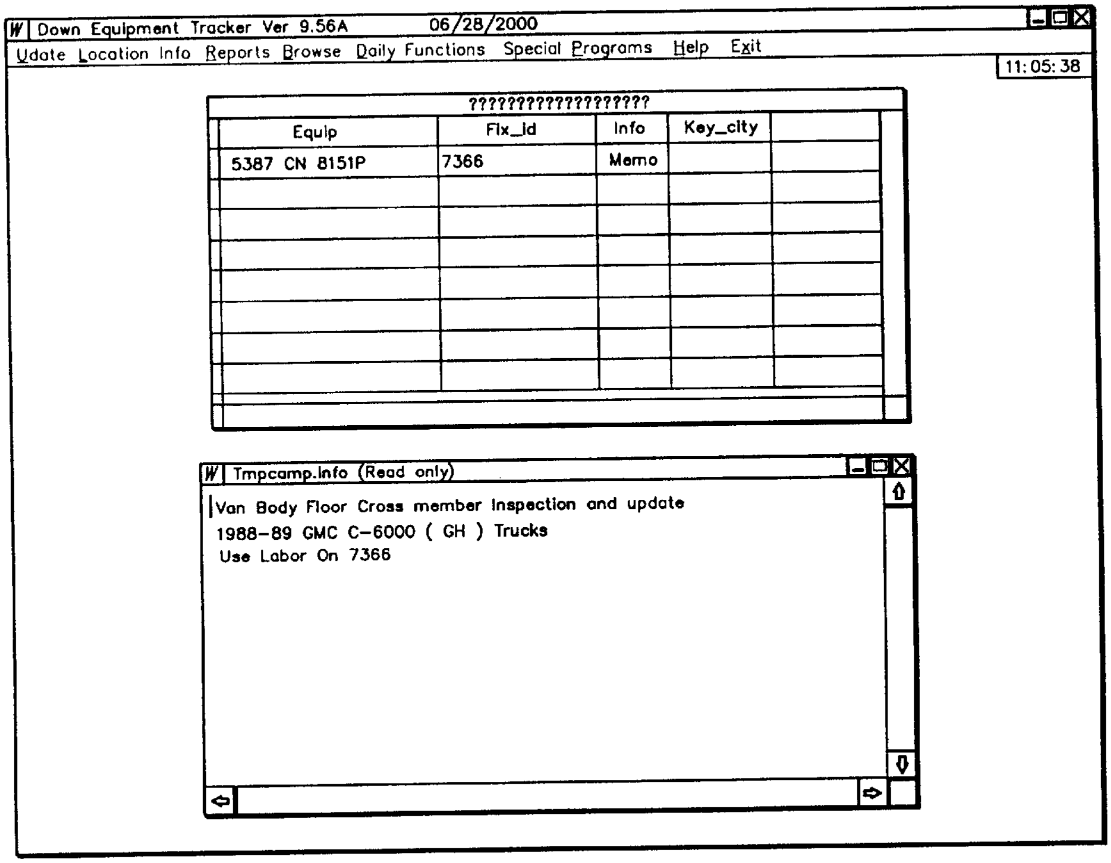
FIG. 16 is an example of a preferred campaign information warning report provided by a central equipment manager according to the present invention.

Local communications terminal 103 and regional communications terminal 102 receive additional information from central equipment manager 101 via electronic network 105. For example, FIG. 16 provides an example campaign information warning report received from central equipment manager 101.

Referring again to FIG. 9, central equipment manager 101 periodically transmits entity master 280 list to local communications terminals 103 using Internet interface 108 and to regional communications terminals 102 using frame relay network 104. Upon receiving entity master 280 list (block 373), local communications terminal 103 and regional communications terminal 102 store the received entity master 280 list using vehicle status database 200 (block 379).

Figure 15:
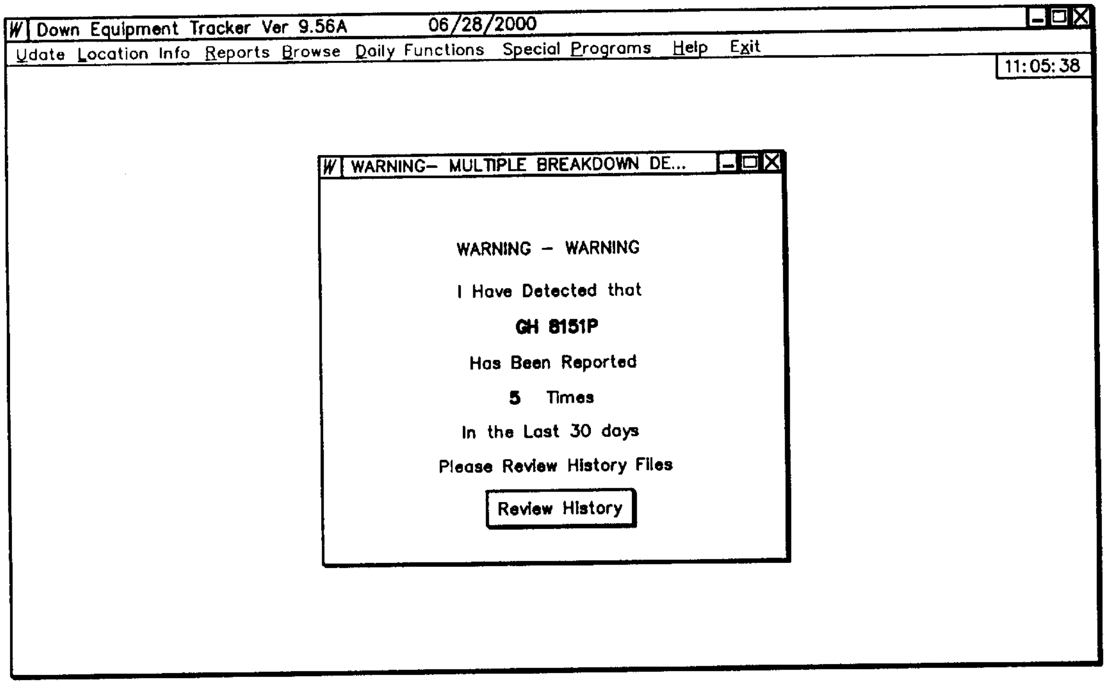
FIG. 15 is a preferred embodiment of an on-screen pop-up multiple breakdown advisory warning provided by a preferred embodiment of the present invention.

Central equipment manager 101 also transmits multiple breakdown advisory 215 to all local communications terminals 102 and all regional communications terminals 103. Upon receiving a multiple breakdown advisory (block 375), local communications terminal 103 and regional communications terminal 102 provide a multiple breakdown advisory warning (block 387) to alert the user to consider this information in assessing the suitability of the vehicle for a particular rental itinerary. In a preferred embodiment, local communications terminal 103 and regional communications terminal 102 provide the advisory warning in the form of an on-screen pop-up warning box on the display device of processor 150. FIG. 15 illustrates a preferred embodiment of an on-screen pop-up multiple breakdown advisory warning.

In addition, regional communications terminal 102 reviews service event notifications 220 received from local communications terminals 103 in vehicle service status files 205 for actual service completion times (block 381).

In a preferred embodiment, regional communications terminal 102 determines if the repair/service action has not occurred by the time specified by availability prediction 260. Specifically, if the repair/service action is not accomplished within 24 hours of the projected completion date specified by availability prediction 260 (block 383), then regional communications terminal 102 provides a service time advisory warning (block 389). The time in excess of the availability prediction 260 that triggers the advisory warning is user-programmable from as little as two hours to as long as four weeks. In a preferred embodiment, regional communications terminal 102 provides the service time advisory warning in the form of an on-screen pop-up warning text box on the display device of processor 150. The user may thereafter take corrective action such as, for example, telephoning the service location to determine the cause of the service delay.

In a preferred embodiment, local communications terminal 103 reviews service event notifications 220 for vehicles whose number of repair/service actions exceed a pre-defined threshold (block 385). If the repair threshold has been exceeded, then regional communications terminal provides multiple breakdown advisory 215 as described above for block 387. In a preferred embodiment, the pre-defined threshold for multiple breakdown advisory is two service event notifications 220 within the last sixty-day period. If the threshold is exceeded, multiple breakdown advisory 215 provides the user the option of retrieving and displaying or printing the service event notifications 220 associated with the vehicle.

Thus, a system and methods for managing a fleet of vehicles has been shown that allows multiple geographically dispersed locations to monitor and track vehicle service status, including generating a prediction of vehicle availability.

While the above description contains many specific details of the preferred embodiments of the present invention, these should not be construed as limitations on the scope of the invention, but rather are presented in the way of exemplification. Other variations are possible. Accordingly, the scope of the present invention should be determined not by the embodiments illustrated above, but by the appended claims and their legal equivalents.

What is claimed is:

1. A method of managing a plurality of moving equipment items comprising the steps of:

maintaining in a moving equipment database information on availability of one or more moving equipment items from the plurality of moving equipment items;

maintaining in the moving equipment database information on repair status of one or more moving equipment items from the plurality of moving equipment items;

creating a service event notification in said moving equipment database pertaining to one or more moving equipment items of said plurality of moving equipment items;

generating a predicted service completion date for said one or more moving equipment items using said service event notification; and automatically communicating said predicted service completion date for said one or more moving equipment items to said moving equipment database.

2. A method as recited in claim 1 wherein creating a predicted service completion date further comprises using a local communication terminal, the moving equipment database operably connected to the local communication terminal.

3. A method as recited in claim 1 wherein automatically communicating said predicted service completion date further comprises disseminating to a plurality of geographic locations the predicted service completion date for said one or more moving equipment items.

4. A method as recited in claim 1 further comprising collecting a plurality of said service event notifications into a moving equipment item service status file in the moving equipment database.

5. A method as recited in claim 1 further comprising generating a predicted availability date for one or more moving equipment items based on the predicted service completion date.

6. A method as recited in claim 1 further comprising:

generating a moving equipment service status report from a plurality of service status files; and transmitting the moving equipment service status report to a plurality of local communication terminals such that moving equipment status information is available at a local communication terminal regardless of the geographic location in which the moving equipment item is located.

7. A method as recited in claim 1 further comprising receiving at a regional communication terminal a repair history message, the message having a list of service event notifications associated with a moving equipment item.

8. A method as recited in claim 7 further comprising:

determining at the regional communication terminal whether the number of service notifications in the repair history message has exceeded a predefined threshold; and providing a warning notification at said regional communication terminal if the predefined threshold has been exceeded, said warning notification useful for prompting a user to take corrective action.

9. A method of managing a plurality of moving equipment items comprising the steps of:

maintaining in an availability databases information on availability of one or more moving equipment items from the plurality of moving equipment items;

maintaining in a moving equipment status database information on repair status of one or more moving equipment items from the plurality of moving equipment items;

creating a service event notification in said moving equipment status database pertaining to one or more moving equipment items of said plurality of moving equipment items;

generating a predicted service completion date for said one or more moving equipment items using said service event notification; and automatically communicating said predicted service completion date for said one or more moving equipment items to said availability database.

10. A method as recited in claim 9 further comprising:

comparing a predicted service completion date to a current moving equipment service status for a moving equipment item contained in said vehicle status database using a regional communications terminal;

determining at said regional communications terminal a condition in which an actual repair completion date is not within a predefined period of elapsed time after the predicted service completion date; and providing a warning notification at said regional communications terminal if the predefined period of elapsed time has been exceeded, said warning notification useful for prompting a user to take corrective action.

11. A system for managing a plurality of moving equipment items, the system comprising:

a moving equipment database for maintaining information on availability and repair status information of one or more moving equipment items from the plurality of moving equipment items;

a service event notifier for creating a service event notification in said moving equipment database, the service event notification pertaining to one or more moving equipment items; and a date dissemination module for automatically communicating a predicted service completion date for said one or more moving equipment items to said moving equipment database.

12. A system for managing moving equipment items comprising:

an availability database for maintaining information on availability of one or more moving equipment items from a plurality of moving equipment items;

a moving equipment status database for maintaining information on repair status of one or more moving equipment items from the plurality of moving equipment items;

a service event notifier for creating a service event notification in said moving equipment status database pertaining to one or more moving equipment items of said plurality of moving equipment items;

a date generator for generating a predicted service completion date for said one or more moving equipment items using said service event notification.

13. A system for managing a plurality of moving equipment items, the system comprising:

a moving equipment database for maintaining information on repair status information of one or more moving equipment items from the plurality of moving equipment items; and a service event notifier for creating a service event notification in said moving equipment database.

14. A system for managing a plurality of moving equipment items, the system comprising:

a central equipment manager;

at least one local equipment manager in communication with the central equipment manager;

an event notification generator for creating a service event notification pertaining to one of the moving equipment items using one of the plurality of local equipment managers;

a first data transmitter capable of transmitting the service event notification from the local equipment manager to the central equipment manager; and a second data transmitter capable of transmitting the service event notification from the central equipment manager to the local equipment manager.

15. A system for managing a plurality of moving equipment items, the system comprising:

means for providing a central equipment manager;

means for providing a plurality of local equipment managers in communication with the central equipment manager;

means for creating a service event notification pertaining to one of the moving equipment items using one of the plurality of local equipment managers;

means for transmitting the service event notification from the one of the plurality of local equipment managers to the central equipment manager; and means for transmitting the service event notification from the central equipment manager to one or more local equipment managers of the plurality of local equipment managers.

* * * * *